A. FORBRIGER.

Drawing-Book.

No. 6,271. Reissued Feb. 2, 1875.

Attest

Th. Hunter

J. Edgar Gross

Inventor

Arthur Forbriger

By F. Millward

Attorney

THE GRAPHIC CO. PHOTO-LITH. 39 & 41 PARK PLACE, N.Y.

UNITED STATES PATENT OFFICE.

ARTHUR FORBRIGER, OF CINCINNATI, OHIO.

IMPROVEMENT IN DRAWING-BOOKS.

Specification forming part of Letters Patent No. 151,965, dated June 16, 1874; reissue No. 6,271, dated February 2, 1875; application filed October 14, 1874.

*To all whom it may concern:*

Be it known that I, ARTHUR FORBRIGER, of Cincinnati, Hamilton county, Ohio, have invented certain new and useful Improvements in Drawing-Books, of which the following is a specification:

My invention is designed especially for young students, and is intended to retain the interest of the pupil studying drawing, and thus add a charm to the work; and my invention consists in the first part of a drawing book or tablet, composed of layers of copies all pasted or secured at the edges in any manner, so that no copy except the one in use can be seen by the pupil. My invention consists, in the second part, in the introduction between said copies of sheets of blank drawing or sketching paper, so that when the copy is exposed, by detaching three of the pasted edges from the binding, a sheet of paper is also exposed for the pupil to use in imitating the copy.

Figure 1:
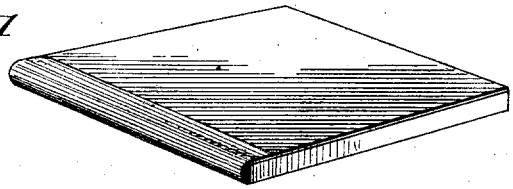
Figure 2:
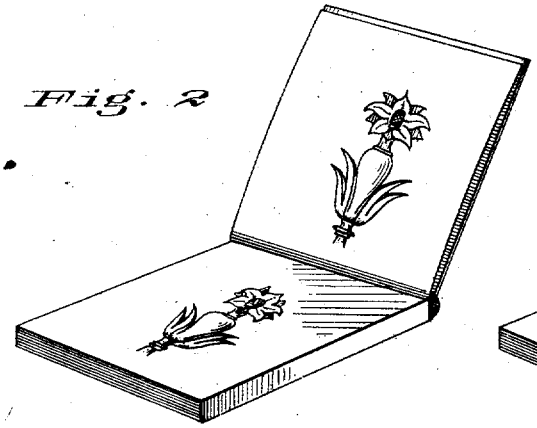
Figure 3:
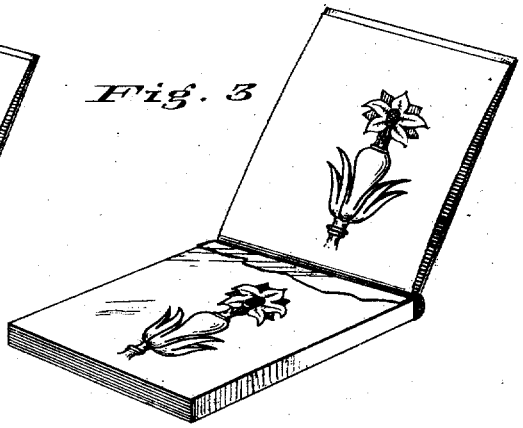
Figure 4:
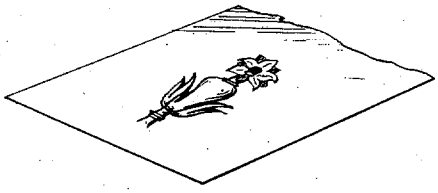

Figure 1 is a perspective view of the drawing-book closed. Fig. 2 is a perspective view of the book when the cover has been thrown back, and the first copy loosened and turned over against it, and the pupil has executed his sketch on the sketching-paper below. Fig. 3 is a view similar to Fig. 2, except that it shows the rough sketch torn from the book, and another sheet of paper with the pupil's finished drawing on, the sketch laid aside being shown in Fig. 4.

My book is so constructed that all the copies are bound together at the edges, and the pupil cannot therefore see more than one at a time, and this is the important feature of my invention; and the drawing-paper which I also prefer to introduce between the copies is bound in, so that none can be exposed and soiled except the sheet required for use.

I prefer that the following sheets be employed, and that they be bound in the following order: First, a sheet with the copy upon it, then a sheet of rough sketching-paper corresponding to each copy for the pupil to use in his first attempts to execute his imitation of the copy, then a sheet of good drawing-paper, (exposed after the rough sketch has been torn off and thrown aside,) the good paper being used to receive the finished effort of the pupil. The binding may be two covers or lids and a back, the whole secured together, as in the drawing, and paper or cloth pasted upon the edges of the sheets composing the book, so as to retain them in place until each is needed for use; or instead of lids united together there may be a sheet of heavy paper for the bottom, and the edges secured as before stated. In this case each sheet as it is raised will be entirely removed from the book, and when the pupil has completed the entire series of copies his work may be bound, as desired.

The object of my invention is to create an interest in this study which, with young pupils in our public schools, is very difficult to obtain, whereas in the common system the pupil on getting his book can look entirely through it and examine each picture, and when he comes to draw them the charm of novelty is entirely gone. I obviate this by constructing, as described, a book in which the pupil can examine only the single picture or subject on which he is engaged. The construction of the book is such, also, that it preserves the pages neat and unsoiled until used. It can, moreover, be produced at very reasonable rates, and binding in the sketching-paper, together with the nice drawing-paper, prevents the necessity of having a practice-book in addition to the usual drawing-book.

I claim—

1. As a new article of manufacture, a drawing book or tablet, composed of layers or sheets, having progressive studies for copy upon them, all pasted or secured on two or more sides at the edges in any manner, so that no study except the one in use can be seen by the pupil, as set forth.

2. A drawing book or tablet, composed, respectively, of blank sheets and sheets with subjects for copy upon them, each copy-sheet being arranged to alternate with one or more blank sheets, and the whole book or tablet pasted or otherwise secured together at two or more of its edges, substantially as and for the purpose specified.

ARTHUR FORBRIGER.

Witnesses:

F. MILLWARD,

EDGAR J. GROSS.